US012683674B2

(12) United States Patent (10) Patent No.: US 12,683,674 B2
Guo (45) Date of Patent: Jul. 14, 2026

(54) METHOD AND DEVICE FOR TCI STATE CONFIGURATION

(71) Applicant: GUANGDONG OPPO MOBILE TELECOMMUNICATIONS CORP., LTD., Dongguan (CN)

(72) Inventor: Li Guo, Allen, TX (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 599 days.

(21) Appl. No.: 18/146,875

(22) Filed: Dec. 27, 2022

(65) Prior Publication Data

US 2023/0132744 A1 May 4, 2023

Related U.S. Application Data

(63) Continuation of application No. PCT/CN2021/102195, filed on Jun. 24, 2021.

(60) Provisional application No. 63/075,894, filed on Sep. 9, 2020.

(51) Int. Cl.
*H04B 7/06* (2006.01)
*H04L 5/00* (2006.01)
*H04W 72/21* (2023.01)
*H04W 72/23* (2023.01)

(52) U.S. Cl.
CPC ....... *H04B 7/06968* (2023.05); *H04L 5/0051* (2013.01); *H04L 5/0094* (2013.01); *H04W 72/21* (2023.01); *H04W 72/23* (2023.01)

(58) Field of Classification Search
CPC .... H04L 5/0051; H04L 5/0094; H04W 72/21; H04W 72/23
See application file for complete search history.

(56) References Cited

U.S. PATENT DOCUMENTS

| 2019/0132828 A1* | 5/2019 | Kundargi | ............. | H04B 17/318 |
| 2019/0320469 A1* | 10/2019 | Huang | ................... | H04W 72/23 |
| 2022/0224479 A1* | 7/2022 | He | ........................ | H04L 5/0044 |

FOREIGN PATENT DOCUMENTS

| CN | 108462552 A | 8/2018 |
| CN | 110535617 A | 12/2019 |
| CN | 110536452 A | 12/2019 |
| CN | 111357230 A | 6/2020 |

OTHER PUBLICATIONS

International Search Report Mailed Aug. 27, 2021 In Application No. PCT/CN2021/102195.
Written Opinion Mailed Aug. 27, 2021 In Application No. PCT/CN2021/102195.

(Continued)

*Primary Examiner* — Duc C Ho
(74) *Attorney, Agent, or Firm* — PERKINS COIE LLP

(57) ABSTRACT

Methods and devices for transmission configuration indicator (TCI) state configuration are provided. The method includes: receiving, by a terminal device, configuration of one or more TCI states from a network device; wherein each of the one or more TCI states includes one or more of: quasi co-location (QCL) information for downlink reception; information for determining a spatial filter for uplink transmission; or information for determining a path loss reference signal for uplink transmission.

19 Claims, 3 Drawing Sheets

(56) References Cited

OTHER PUBLICATIONS

OPPO, Discussion in Email, Thread #5, R1-200xxxx, 3GPP TSG RAN WG1 #102-e, Aug. 28, 2020, 38 pages.
3GPP TS 38.211 V16.0.0 (Dec. 2019), 3rd Generation Partnership Project; Technical Specification Group Radio Access Network; NR; Physical channels and modulation, 124 pages.
3GPP TS 38.211 V16.2.0 (Jun. 2020), 3rd Generation Partnership Project; Technical Specification Group Radio Access Network; NR; Physical channels and modulation, 126 pages.
3GPP TS 38.212 V16.0.0 (Dec. 2019), 3rd Generation Partnership Project; Technical Specification Group Radio Access Network; NR; Multiplexing and channel coding, 141 pages.
3GPP TS 38.212 V16.2.0 (Jun. 2020), 3rd Generation Partnership Project; Technical Specification Group Radio Access Network; NR; Multiplexing and channel coding, 146 pages.
3GPP TS 38.213 V16.0.0 (Dec. 2019), 3rd Generation Partnership Project; Technical Specification Group Radio Access Network; NR; Physical layer procedures for control, 145 pages.
3GPP TS 38.213 V16.2.0 (Jun. 2020), 3rd Generation Partnership Project; Technical Specification Group Radio Access Network; NR; Physical layer procedures for control, 176 pages.
3GPP TS 38.214 V16.0.0 (Dec. 2019), 3rd Generation Partnership Project; Technical Specification Group Radio Access Network; NR; Physical layer procedures for data, 147 pages.
3GPP TS 38.214 V16.2.0 (Dec. 2020), 3rd Generation Partnership Project; Technical Specification Group Radio Access Network; NR; Physical layer procedures for data, 163 pages.
3GPP TS 38.215 V16.0.0 (Dec. 2019), 3rd Generation Partnership Project; Technical Specification Group Radio Access Network; NR; Physical layer measurements, 21 pages.
3GPP TS 38.321 V16.0.0 (Mar. 2020), 3rd Generation Partnership Project; Technical Specification Group Radio Access Network; NR; Medium Access Control (MAC) protocol specification, 140 pages.
3GPP TS 38.331 V16.0.0 (Mar. 2020), 3rd Generation Partnership Project; Technical Specification Group Radio Access Network; NR; Radio Resource Control (RRC) protocol specification, 832 pages.
Search Report of the European application No. 21865625.4, issued on Dec. 8, 2023. 18 pages.
ZTE,R1-2003483,"Preliminary views on further enhancement, for NR MIMO", 3GPP TSG RAN WG1 Meeting#101-e; e-Meeting, May 25-Jun. 5, 2020, 18 pages.
Vivo,R1-2005363,"Discussion on multi-beam enhancement", 3GPP TSG RAN WG1 #102-e, e-Meeting, Aug. 17-28, 2020, 21 pages.

* cited by examiner

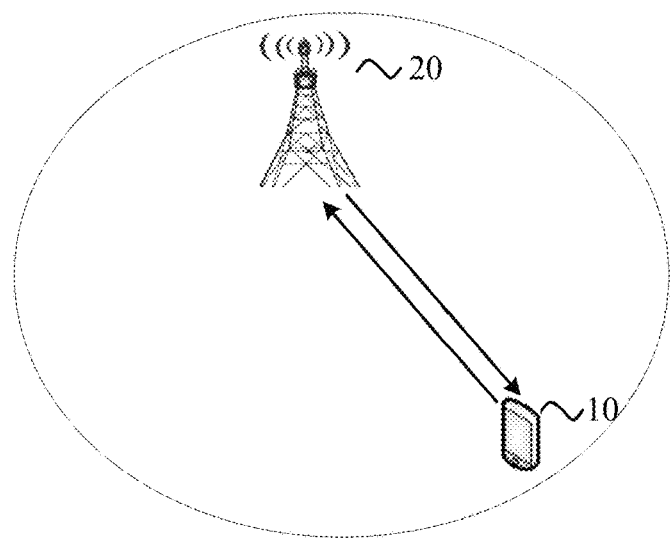

FIG. 1

A terminal device receives configuration of one or more TCI states from a network device                     210

FIG. 2

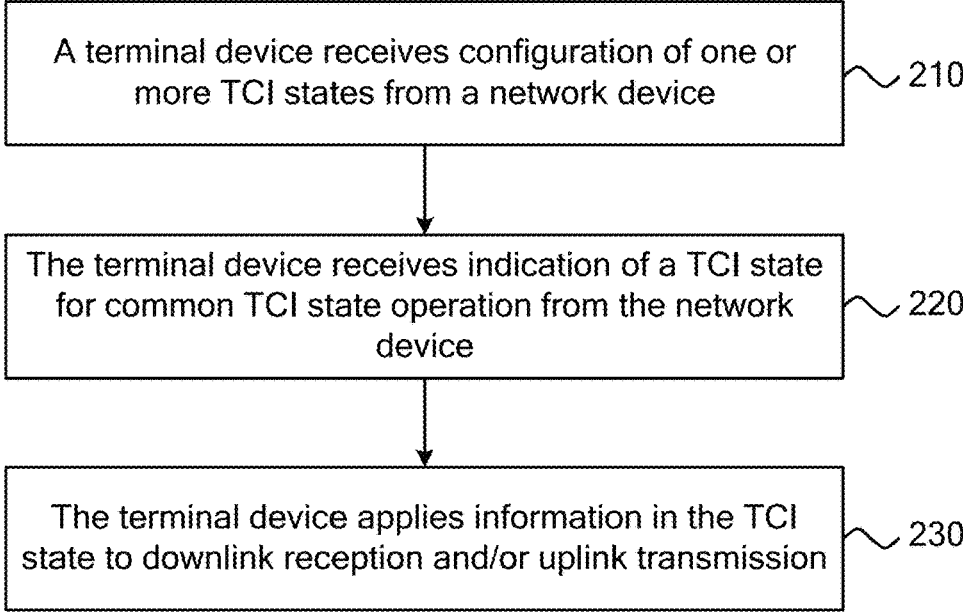

A terminal device receives configuration of one or more TCI states from a network device                     210

The terminal device receives indication of a TCI state for common TCI state operation from the network device                     220

The terminal device applies information in the TCI state to downlink reception and/or uplink transmission                     230

FIG. 3

METHOD AND DEVICE FOR TCI STATE CONFIGURATION

CROSS-REFERENCE TO RELATED APPLICATION

The present application is a continuation application of International Application No. PCT/CN2021/102195, filed on Jun. 24, 2021, which claims the priority of US provisional application U.S. 63/075,894, filed on Sep. 9, 2020. The present application claims priority and the benefit of the above-identified applications and the above-identified applications are incorporated by reference herein in their entireties.

TECHNICAL FIELD

The present disclosure relates to the communication field, and more particularly, to methods and devices for transmission configuration indicator (TCI) state configuration.

BACKGROUND

A New Radio (NR)/5G system generally supports multi-beam operation on downlink and uplink physical channels and reference signals. The use case for supporting multi-beam operation mainly is for deployment of a high-frequency band system, where high-gain analog beamforming is used to combat large path loss.

The 3GPP standards: 3GPP TS 38.211 V16.0.0: "NR; Physical channels and modulation", 3GPP TS 38.212 V16.0.0: "NR; Multiplexing and channel coding", 3GPP TS 38.213 V16.0.0: "NR; Physical layer procedures for control", 3GPP TS 38.214 V16.0.0: "NR; Physical layer procedures for data", 3GPP TS 38.215 V16.0.0: "NR; Physical layer measurements", 3GPP TS 38.321 V16.0.0: "NR; Medium Access Control (MAC) protocol specification", and 3GPP TS 38.331 V16.0.0: "NR; Radio Resource Control (RRC) protocol specification" disclose relevant background technologies.

SUMMARY

Implementations of the present disclosure provide methods and devices for TCI state configuration.

In an aspect, a method for TCI state configuration is provided. The method includes: receiving, by a terminal device, configuration of one or more TCI states from a network device; wherein each of the one or more TCI states includes one or more of: quasi co-location (QCL) information for downlink reception; information for determining a spatial filter for uplink transmission; or information for determining a path loss reference signal for uplink transmission.

In another aspect, a method for TCI state configuration is provided. The method includes: configuring, by a network device, one or more TCI states for a terminal device; wherein each of the one or more TCI states includes one or more of: QCL information for downlink reception; information for determining a spatial filter for uplink transmission; or information for determining a path loss reference signal for uplink transmission.

In yet another aspect, a terminal device is provided. The terminal device includes: a receiving module, configured to receive configuration of one or more TCI states from a network device; wherein each of the one or more TCI states includes one or more of: QCL information for downlink reception; information for determining a spatial filter for uplink transmission; or information for determining a path loss reference signal for uplink transmission.

In yet another aspect, a network device is provided. The network device includes: a transmitting module, configured to send configuration of one or more TCI states to a terminal device; wherein each of the one or more TCI states includes one or more of: QCL information for downlink reception; information for determining a spatial filter for uplink transmission; or information for determining a path loss reference signal for uplink transmission.

A better understanding of the nature and advantages of implementations of the present disclosure may be gained with reference to the following detailed description and the accompanying drawings.

BRIEF DESCRIPTION OF DRAWINGS

FIG. 1 is a schematic diagram of an exemplary application scenario where an implementation of the present disclosure may be applied.

FIG. 2 is a schematic diagram of a method for TCI state configuration according to an implementation of the present disclosure.

FIG. 3 is a schematic diagram of a method for TCI state configuration according to an implementation of the present disclosure.

DETAILED DESCRIPTION

Figure 4:
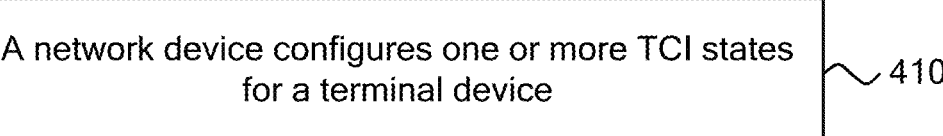
FIG. 4 is a schematic diagram of a method for TCI state configuration according to an implementation of the present disclosure.

The technical solutions of exemplary implementations of the present disclosure will be described below with reference to the accompanying drawings. It should be understood that the exemplary implementations are intended for better understanding of the technical solutions of the present disclosure, rather than limiting the scope of the application, and skilled artisans would understand that the exemplary implementations and features disclosed herein can be combined according to actual needs.

The acts shown in the flowchart of the accompanying drawings may be implemented at least in part by a computer system storing a set of computer-executable instructions. In addition, although a logical sequence is shown in the flowchart, in some cases the acts shown or described may be performed in a different sequence, or some acts may be not performed at all.

The technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS) system, a long term evolution (LTE) system, a LTE Frequency Division Duplex (FDD) system, a LTE Time Division Duplex (TDD) system, a Universal Mobile Telecommunication System (UMTS) system, a Worldwide Interoperability for Microwave Access (WiMAX) communication system, a New Radio (NR) system or fifth-generation (5G) system, or a further communication system.

A terminal device in implementations of the present disclosure may refer to user equipment (UE), an access terminal, a subscriber unit, a subscriber station, a mobile station, a rover station, a remote station, a remote terminal, a mobile device, a user terminal, a terminal, a wireless communication device, a user agent, or a user device. The access terminal may be a cellular phone, a cordless phone, a session initiation protocol (SIP) phone, a wireless local loop (WLL) station, a personal digital assistant (PDA), a handheld device with a wireless communication function, a computing device or other processing devices connected to a wireless modem, an on-board device, a wearable device, a terminal device in a 5G network, or a terminal device in an evolved public land mobile network (PLMN), etc., which are not restricted in the implementations of the present disclosure.

A network device (e.g., a base station) in implementations of the present disclosure may be a device for communicating with a terminal device, and the network device may be a Base Transceiver Station (BTS) in the GSM or CDMA system, a NodeB (NB) in the WCDMA system, an evolved base station (eNB or eNodeB) in the LTE system, or a wireless controller in a Cloud Radio Access Network (CRAN) scenario, or the network device may be a relay station, an access point, an on-board device, a wearable device, a network device (e.g., gNB) in a 5G network, or a network device in an evolved PLMN, etc., which are not restricted in the implementations of the present disclosure.

FIG. 1 shows a schematic diagram of an exemplary application scenario where an implementation of the present disclosure may be applied. A communication system shown in FIG. 1 may include a terminal device 10 and a network device 20. The network device 20 is configured to provide a communication service for the terminal device 10 and is connected to a core network (not shown). The terminal device 10 accesses the network by searching for a synchronization signal, or a broadcast signal, etc., transmitted by the network device 20 to communicate with the network. Arrows shown in FIG. 1 may indicate uplink/downlink transmission through cellular links between the terminal device 10 and the network device 20.

In some exemplary implementations of the present disclosure, a terminal device is described as a UE as an example, but skilled artisans should understand that the terminal device in the present disclosure is not limited to the UE, but can also be other types of terminal device as mentioned above.

NR release 15/16 supports the function of indicating a beam used for a channel such as a physical downlink control channel (PDCCH), a physical downlink shared channel (PDSCH), a physical uplink control channel (PUCCH), or a physical uplink shared channel (PUSCH), or a reference signal such as a channel state information reference signal (CSI-RS) or a sounding reference signal (SRS), through the framework of TCI-state for downlink transmission or spatial relation for uplink transmission.

For PDCCH and PDSCH, a UE may be configured with M TCI-states in higher layer signaling as candidate quasi co-location (QCL) configurations. For each control resource set (CORESET) for PDCCH transmission, the UE can be configured with one or more TCI-states semi-statically and if more than one TCI-state is configured, one MAC control element (CE) command is used to activate one of those TCI-states as the active transmit (Tx) beam for PDCCH transmission. For PDSCH, one MAC CE activation command can activate up to 8 TCI-states and each TCI-state is mapped to one codepoint in the downlink control information (DCI) scheduling PDSCH transmission. Then for each individual PDSCH transmission, the network (NW) can dynamically indicate one of those up to 8 TCI-states through the scheduling DCI.

The system can also use a single MAC CE to update/indicate TCI state(s) for PDCCH and PDSCH in multiple component carriers (CCs) simultaneously. Using a single MAC CE message to update TCI state(s) for PDCCH and PDSCH in multiple different CCs can reduce the overhead of control signaling. Particularly, the system can configure a list of cells for simultaneous TCI state for PDCCH and PDSCH. The system can send one MAC CE indicating one TCI state identity (Id) and one CORESET index, and the UE may apply the antenna port quasi co-location provided by the indicated TCI state to the CORESET with the indicated index of all the configured cells in the configured list. For PDSCH transmission, the system can send one MAC CE message that activates up to 8 TCI state Ids for PDSCH transmission and the UE may apply the indicated TCI state Ids on the PDSCH transmission in all the configured cells in the configured list. There are two special cases for determining the TCI state for a PDSCH transmission.

If a DCI does not contain a TCI field and the time offset between the PDSCH and the scheduling DCI is equal or greater than a threshold timeDurationForQCL, the TCI state applied to the CORESET used for the PDCCH transmission scheduling the PDSCH may be applied to the PDSCH transmission.

If a DCI does not contain a TCI field and the time offset between the PDSCH and the scheduling DCI is less than the threshold timeDurationForQCL, the UE would apply a 'default' TCI state on the PDSCH reception and the 'default' TCI state is the TCI state or QCL assumption of the CORESET with lowest controlResourceSetId in the latest slot in which one or more CORESETs within the active BWP of serving cell are monitored by the UE.

The Tx beam information for CSI-RS transmission is indicated through a TCI-state configured or indicated to a CSI-RS resource. For a periodic CSI-RS resource, the TCI-state is configured in RRC signaling semi-statically. For a semi-persistent CSI-RS resource, the TCI-state can be configured in RRC signaling semi-statically or indicated in the MAC CE message that activates the transmission of semi-persistent CSI-RS. For an aperiodic CSI-RS resource, the TCI-state is configured to the CSI-RS resource in the configuration of aperiodic CSI-RS trigger state in RRC signaling. Then the gNB can use physical layer signaling to dynamically trigger the transmission of aperiodic CSI-RS transmission and also dynamically indicate the Tx beam information.

For SRS transmission, a UE Tx beam is configured or indicated through spatial relation info. For periodic SRS transmission, the spatial relation info is configured per SRS resource in RRC signaling semi-statically. For aperiodic SRS transmission, the spatial relation info can be configured in RRC signaling semi-statically, which is one method and another method is the NW can use one MAC CE to update/indicate spatial relation info for an SRS resource, which thus provide more dynamic spatial relation info updating. For semi-persistent SRS transmission, the spatial relation info can be included in the MAC CE activation command that activates the transmission of semi-persistent SRS resource. To reduce the overhead of MAC CE for indicating spatial relation info for SRS, the system can use a single MAC CE to indicate one spatial relation info for SRS resources in multiple different cells. The UE can be provided with a list of CCs and a MAC CE can be used to indicate spatial relation info for all the SRS resource with a same resource Id in all the CCs included in the configured list.

For PUCCH transmission, a UE Tx beam is configured through PUCCH spatial relation info. The UE is provided with one or more than one PUCCH spatial relation info configuration in RRC signaling semi-statically. Then for each PUCCH resource, the UE can be indicated with one PUCCH spatial relation info through a MAC CE activation command To reduce the overhead of MAC CE for indicating spatial relation info for PUCCH, the system can use a single MAC CE to indicate one spatial relation info for a group of PUCCH resources.

Furthermore, when the UE is not provided with spatial relation info to an SRS resource or PUCCH resource, the UE can apply a default spatial relation info on the SRS resource or PUCCH resource. The default spatial relation info is pre-specified as follows:

In a BWP where the UE is configured with any CORE-SET for PDCCH transmission, the default spatial relation info is the TCI state with the lowest controlResourceSetId.

In a BWP where the UE is not configured with any CORESET for PDCCH transmission, the default spatial relation info is the activated TCI state with lowest ID among the TCI states activated for PDSCH in the same BWP.

Currently used methods may have the following drawbacks:

Generally, the downlink and uplink transmission would use the same 'best' beam pair link. But the current method uses separate signaling to indicate the Tx beam for them. The consequence is signaling overhead is increased and thus latency of beam switch is increased.

The TCI-state for PDCCH and PDSCH is configured in each serving cell. In intra-band carrier aggregation (CA) scenario, the system would apply the same Tx beams on the transmission in all the cells but the current method requires to configure TCI-states in each cell and indicates the same TCI-state IDs for PDCCH and PDSCH in different serving cells. Even though the system can configure the same QCL-TypeD reference signal in the TCI states with the same ID in different serving cells by implementation so that the same Tx beam(s) is applied to the PDCCH and PDSCH in different serving cells, this would impose huge limitation on NW implementation. When to switch the Tx beam for PDCCH and PDSCH due to UE mobility, the NW would have to re-configure the TCI-states in all the serving cells, which increases the signaling overhead and increases the latency too.

The present disclosure provides methods and devices for overcoming the drawbacks of the current methods.

FIG. 2 is a schematic diagram of a method for TCI state configuration according to an implementation of the present disclosure. As shown in FIG. 2, the method includes act 210. In act 210, a terminal device receives configuration of one or more TCI states from a network device. Herein, each of the one or more TCI states includes one or more of: QCL information for downlink reception, information for determining a spatial filter for uplink transmission, or information for determining a path loss reference signal for uplink transmission.

The downlink reception may include reception on at least one of: a PDSCH, a PDCCH or a CSI-RS resource, and the uplink transmission may include transmission on at least one of: a PUSCH, a PUCCH or a SRS resource.

In an exemplary implementation, each of the one or more TCI states includes one or more of following parameters: a reference signal configured for QCL-TypeD quasi co-location type; a reference signal for determining a spatial filter for uplink transmission; a reference signal configured for QCL-TypeD quasi co-location type and for determining a spatial filter for uplink transmission; a reference signal for determining a path loss reference signal for uplink transmission; or a reference signal configured for QCL-TypeD quasi co-location type and for determining a spatial filter and a path loss reference signal for uplink transmission.

For example, a UE can be configured with one or more higher layer parameters TCI state and in each TCI state, the UE can be provided with one or more of the following parameters:

One reference signal providing 'QCL-TypeD' quasi co-location type for quasi co-location relationship between one or two downlink reference signals and the demodulation reference signal (DM-RS) ports of the PDSCH, the DM-RS port of PDCCH or the CSI-RS port(s) of a CSI-RS resource.

One reference signal providing information for determining a spatial filter for the transmission of PUSCH, PUCCH or an SRS resource.

One reference signal providing both 'QCL-TypeD' for PDSCH, PDCCH or CSI-RS resource and a spatial filter for PUSCH, PUCCH or the SRS resource.

One reference signal providing a path loss reference signal for PUSCH, PUCCH or the SRS resource.

One reference signal providing both 'QCL-TypeD' for PDSCH, PDCCH or CSI-RS resource and a spatial filter and a path loss reference signal for PUSCH, PUCCH or the SRS resource.

In an exemplary implementation, the reference signal configured for QCL-TypeD quasi co-location type is a synchronization signal/physical broadcast channel (SS/PBCH) block, a CSI-RS resource, or an SRS resource. The reference signal for determining a spatial filter for uplink transmission is an SS/PBCH block, a CSI-RS resource or an SRS resource. The reference signal for determining a path loss reference signal for uplink transmission is an SS/PBCH block or a CSI-RS resource.

For example, an RS providing QCL assumption can be an SS/PBCH block, a CSI-RS resource or an SRS resource. An RS providing information for determining a spatial filter for PUSCH, PUCCH or SRS resource can be an SS/PBCH block, a CSI-RS resource or an SRS resource. An RS providing information of path loss RS for PUSCH, PUCCH or SRS resource can be an SS/PBCH block or a CSI-RS resource.

In an exemplary implementation, the terminal device receives the configuration of the one or more TCI states through RRC signaling.

In one example, a TCI state for downlink (DL) and uplink (UL) can be configured through the following RRC parameter:

```
TCI-State ::=                        SEQUENCE {
    tci-StateId                          TCI-StateId,
    qcl-spatial-Type1                        QCL-Spatial-Info,
    qcl-spatial-Type2                        QCL-Spatial-Info
    ...
}
QCL-Spatial-Info ::=                     SEQUENCE {
    cell                                 ServCellIndex
OPTIONAL,    -- Need R
    bwp-Id                               BWP-Id
OPTIONAL, -- Cond CSI-RS-Indicated
    referenceSignal                      CHOICE {
        csi-rs                               NZP-CSI-RS-ResourceId,
        ssb                                  SSB-Index
        srs                                  SRS-ResourceId
    },
    qcl-Type                         ENUMERATED {typeA, typeB, typeC, typeD},
    spaitialInfo                     ENUMERATED {enabled},
    pathLossRs                       ENUMERATED {enabled}
    ...
}
```

20

In another example, a TCI state for DL and UL transmission can be configured through the following RRC parameter:

```
TCI-State ::=                        SEQUENCE {
    tci-StateId                          TCI-StateId,
    qcl-Type1                            QCL-Info,
    qcl-Type2                            QCL-Info
OPTIONAL,    -- Need R
    spatialSettingInfo                   Spatial-Info
    ...
}
QCL-Info ::=                         SEQUENCE {
    cell                                 ServCellIndex
OPTIONAL,    -- Need R
    bwp-Id                               BWP-Id
OPTIONAL, -- Cond CSI-RS-Indicated
    referenceSignal                      CHOICE {
        csi-rs                               NZP-CSI-RS-ResourceId,
        ssb                                  SSB-Index
    },
    qcl-Type                         ENUMERATED {typeA, typeB, typeC, typeD},
    ...
}
Spatial-Info ::=           SEQUENCE {
    cell                                 ServCellIndex
OPTIONAL,    -- Need R
    bwp-Id                               BWP-Id
OPTIONAL, -- Cond CSI-RS-Indicated
    referenceSignal                          CHOICE {
        ssb-Index                                SSB-Index,
        csi-RS-Index                             NZP-CSI-RS-ResourceId,
        srs                                      SRS-ResourceId
    }
    pathlossReferenceRS                  PathlossReferenceRS-Config
}
PathlossReferenceRS-Config ::=           CHOICE {
    ssb-Index                                SSB-Index,
    csi-RS-Index                             NZP-CSI-RS-ResourceId
}
```

In an exemplary implementation, for a first reference signal configured in a TCI state, the TCI state includes one or more of following parameters: a parameter for indicating the quasi co-location type of the first reference signal; a parameter for indicating whether the first reference signal provides information for determining a spatial filter for uplink transmission; or a parameter for indicating whether the first reference signal provides information of a path loss reference signal for uplink transmission. The quasi co-location type of the first reference signal may be QCL-TypeA, QCL-TypeB, QCL-TypeC or QCL-TypeD.

For example, for a first RS configured in a TCI state, a UE can be provided with one or more of the following higher layer parameters to indicate the quasi co-location type or information of spatial filter or information of path loss RS of the first RS:

Higher layer parameter qcl-Type to indicate the quasi co-location type of the first RS. In one example, the value of the higher layer parameter qcl-Type can be 'QCL-TypeA', 'QCL-TypeB', 'QCL-TypeC', or 'QCL-TypeD'.

A higher layer parameter spatialSetting that is used to indicate if the first RS provides the information for determining a spatial filter for uplink transmission.

A higher layer parameter pathlossRS that is used to indicate if the first RS provides the information of path loss RS for uplink transmission.

In an exemplary implementation, the method further includes: the terminal device estimates path loss for determining a transmit power for uplink transmission by using a reference signal configured for QCL-TypeD quasi co-location type in a TCI state; or the terminal device estimates path loss for determining a transmit power for uplink transmission by using a reference signal configured for QCL-TypeA, QCL-TypeB or QCL-TypeC quasi co-location type in the TCI state.

In one example, when one TCI state is indicated, the UE can assume to use the RS configured for 'QCL-TypeD' to estimate path loss for determining a transmit power for uplink transmission.

In another example, when one TCI state is indicated and there is an RS configured for 'QCL-TypeD' in the indicated TCI state, the UE can assume to use the RS configured for 'QCL-TypeA' (or QCL-TypeB, or QCL-TypeC) to estimate path loss for determining a transmit power of uplink transmission.

In an exemplary implementation, the terminal device receives a DCI indicating a first TCI state from the network device. When the first TCI state does not include configuration of a spatial filter for uplink transmission, the terminal device derives a spatial filter for uplink transmission by using a reference signal configured for QCL-TypeD quasi co-location type in the first TCI state. When the first TCI state does not include configuration of a path loss reference signal for uplink transmission, the terminal device estimates path loss for uplink transmission by using the reference signal configured for QCL-TypeD quasi co-location type in the first TCI state, or the terminal device estimates path loss for uplink transmission by using a reference signal configured in the QCL information in the first TCI state.

For example, a UE receives a DCI indicating a first TCI state for PDCCH, PDSCH, PUSCH, PUCCH, CSI-RS or SRS transmission. If the first TCI state does not include configuration of a spatial filter and a path loss RS for PUSCH/PUCCH/SRS, in an example, the UE may use the reference signal configured in QCL-TypeD in the first TCI state to derive a spatial filter for PUSCH/PUCCH/SRS transmission and the UE may use the reference signal configured in QCL-TypeD in the first TCI state to estimate the path loss for PUSCH/PUCCH/SRS transmission. In an example, if the first TCI state does not include a QCL-TypeD RS, the UE may use the reference signal configured in QCL information in the first TCI state to estimate the path loss for PUSCH/PUCCH/SRS transmission.

In an exemplary method, a UE can be configured with one or more TCI states providing QCL information for reception of PDSCH, PDCCH or CSI-RS resource, and/or information to determine a spatial filter and a path loss RS for transmitting PUSCH, PUCCH or SRS resource.

In one example, the UE can be configured with M TCI states and each TCI state can provide QCL information for reception of PDSCH, PDCCH or CSI-RS resource, and information to determine a spatial filter and a path loss RS for transmitting PUSCH, PUCCH or SRS resource.

In one example, the UE can be configured with M TCI states and each TCI state can provide QCL information for reception of PDSCH, PDCCH or CSI-RS resource, and/or information to determine a spatial filter and a path loss RS for transmitting PUSCH, PUCCH or SRS resource.

In one example, the UE can be configured with a first list of $M_1$ TCI states and each TCI state in the first list can provide QCL information for reception of PDSCH, PDCCH or CSI-RS resource, and a second list of $M_2$ TCI states and each TCI state in the second list can provide information to determine a spatial filter and a path loss RS for transmitting PUSCH, PUCCH or SRS resource.

FIG. 3 is a schematic diagram of a method for TCI state configuration according to an implementation of the present disclosure. As shown in FIG. 3, in addition to the act 210, the method may further include acts 220 and 230. In act 220, the terminal device receives indication of a TCI state for common TCI state operation from the network device. In act 230, the terminal device applies information in the TCI state to downlink reception and/or uplink transmission.

In an exemplary implementation, the terminal device receives, from the network device, indication of a TCI state for common TCI state operation, through a DCI or a MAC CE, the terminal device applies the QCL information in the TCI state to reception on a PDCCH and a PDSCH, and the terminal device applies the information for determining a spatial filter and/or a path loss reference signal in the TCI state to transmission on a PUSCH and a PUCCH.

For example, a UE can be configured with a single common TCI state operation mode. When the UE is configured in the single common TCI state operation mode, the UE can be indicated with a TCI state through for example a DCI or MAC CE and the UE can be requested to apply the QCL information provided by the TCI state on the reception of all UE-specific PDCCH and PDSCH and the information of spatial filter and path loss RS provided by the TCI state on the transmission of all PUSCH and PUCCH and some SRS resources.

In an exemplary implementation, a CSI-RS resource set is configured with a parameter for indicating whether the terminal device is requested to perform reception on CSI-RS resources in the CSI-RS resource set by following the QCL information in the TCI state for common TCI state operation; or a CSI-RS resource is configured with a parameter for indicating whether the terminal device is requested to perform reception on the CSI-RS resource by following the QCL information in the TCI state for common TCI state operation.

In one example, a CSI-RS resource set can be configured with a higher layer parameter that is used to indicate if the UE is requested to receive the CSI-RS resources in the CSI-RS resource set by following the QCL information provided in the TCI state indicated for common TCI state operation.

In one example, a CSI-RS resource can be configured with a higher layer parameter that is used to indicate if the UE is requested to receive the CSI-RS resource by following the QCL information provided in the TCI state indicated for common TCI state operation.

In an exemplary implementation, a SRS resource set is configured with a parameter for indicating whether the terminal device is requested to perform transmission on SRS resources in the SRS resource set by following the information for determining a spatial filter and/or a path loss reference signal in the TCI state for common TCI state operation; or a SRS resource is configured with a parameter for indicating whether the terminal device is requested to perform transmission on the SRS resource by following the information for determining a spatial filter and/or a path loss reference signal in the TCI state for common TCI state operation.

In one example, an SRS resource set can be configured with a higher layer parameter that is used to indicate if the UE is requested to transmit the SRS resources in the SRS resource set by following the information of spatial filter and path loss RS provided in the TCI state indicated for common TCI state operation.

In one example, an SRS resource can be configured with a higher layer parameter that is used to indicate if the UE is requested to transmit the SRS resource by following the information of spatial filter and path loss RS provided in the TCI state indicated for common TCI state operation.

In an exemplary implementation, the terminal device applies the QCL information in the TCI state for common TCI state operation to reception on CSI-RS resources in a CSI-RS resource set.

In an exemplary implementation, the terminal device applies the information for determining a spatial filter and/or a path loss reference signal in the TCI state for common TCI state operation to transmission on SRS resources in an SRS resource set.

For example, a UE can be provided with a higher layer parameter commonTciState that is used to indicate the UE to operate in a single common TCI state operation mode. When the UE receives a first TCI state for common TCI state operation through a DCI or a MAC CE, the UE may apply the QCL information indicated in the first TCI state on the reception of UE-specific PDCCH, PDSCH and CSI-RS resource for CSI acquisition and the UE may apply the information of spatial filter and path loss RS provided in the first TCI state to determine a spatial filter and to estimate path loss for transmitting PUSCH, PUCCH and SRS resources.

In one example, when the UE is configured with the higher layer parameter commonTciState for indicating the UE to operate in a single common TCI state operation mode and the UE is indicated with a first TCI state for common TCI state operation, the UE can be requested to assume to apply the QCL information provided by the first TCI state to receive CSI-RS resources in a non-zero-power (NZP) CSI-RS resource set used for CSI acquisition, i.e., a NZP-CSI-RS-ResourceSet not configured with the higher layer parameter trs-Info or the higher layer parameter repetition.

For a CSI-RS resource set configured with the higher layer parameter repetition set to 'on', the UE can be requested to assume to apply the QCL information provided by the first TCI state to receive CSI-RS resources in the set.

In one example, when the UE is configured with the higher layer parameter commonTciState for indicating the UE to operate in a single common TCI state operation mode and the UE is indicated with a first TCI state for common TCI state operation, if a CSI-RS resource set is configured with a higher layer parameter that indicates the UE to follow the common TCI state to receive the CSI-RS resource in that set, the UE can be requested to apply the QCL information provided by the first TCI state to receive the CSI-RS resources in the set. This method can be used to configure some CSI-RS resource set used for beam management to follow the common TCI state indication.

In one example, when the UE is configured with the higher layer parameter commonTciState for indicating the UE to operate in a single common TCI state operation mode and the UE is indicated with a first TCI state for common TCI state operation, the UE can be requested to use the information of spatial filter and/or path loss RS provided in the first TCI state to determine a spatial filter and estimate path loss for the transmission of SRS resources in an SRS resource set used for codebook-based transmission, non-codebook-based transmission and/or antenna switching.

In one example, when the UE is configured with the higher layer parameter commonTciState for indicating the UE to operate in a single common TCI state operation mode and the UE is indicated with a first TCI state for common TCI state operation, if an SRS resource set is configured with a higher layer parameter that indicates the UE to follow the common TCI state indication to transmit the SRS resources in that set, the UE can be requested to use the information of spatial filter and/or path loss RS provided in the first TCI state to determine a spatial filter and/or estimate path loss for the transmission of SRS resources in that SRS resource set.

In an exemplary implementation, the terminal device receives, from the network device, indication of a TCI state for common TCI state operation in downlink, through a DCI or a MAC CE, and the terminal device applies the QCL information in the TCI state to reception on a PDCCH, a PDSCH and a CSI-RS resource.

For example, a UE can be provided with a higher layer parameter commonTciStateDL that is used to indicate the UE to operate in a single common TCI state operation mode for DL reception. When the UE receives a first TCI state for common TCI state operation through a DCI or a MAC CE, the UE may apply the QCL information indicated in the first TCI state on the reception of UE-specific PDCCH, PDSCH and some CSI-RS resources.

In an exemplary implementation, the terminal device receives, from the network device, indication of a TCI state for common TCI state operation in uplink, through a DCI or a MAC CE, and the terminal device applies the information for determining a spatial filter and/or a path loss reference signal in the TCI state to transmission on a PUSCH, a PUCCH and a SRS resource.

For example, a UE can be provided with a higher layer parameter commonTciStateUL that is used to indicate the UE to operate in a single common TCI state operation mode for UL channels and signals. When the UE receives a first TCI state for common TCI state operation through a DCI or a MAC CE, the UE may apply the information of spatial filter and path loss RS provided in the first TCI state to determine a spatial filter and to estimate path loss for transmitting PUSCH, PUCCH and SRS resources.

In an exemplary implementation, the terminal device receives, from the network device, indication of a TCI state for common TCI state operation for control channels, through a DCI or a MAC CE, and the terminal device applies the QCL information in the TCI state to reception on a PDCCH, and applies the information for determining a spatial filter and/or a path loss reference signal in the TCI state to transmission on a PUCCH.

For example, a UE can be provided with a higher layer parameter commonTciStateControl that is used to indicate the UE to operate in a single common TCI state operation mode for all control channels. When the UE receives a first TCI state for common TCI state operation through a DCI or a MAC CE, the UE may apply the QCL information indicated in the first TCI state on the reception of UE-specific PDCCH and the UE may apply the information of spatial filter and path loss RS provided in the first TCI state to determine a spatial filter and to estimate path loss for transmitting PUCCH.

In an exemplary implementation, the terminal device receives, from the network device, indication of a TCI state for common TCI state operation for data channels and reference signals, through a DCI or a MAC CE, and the terminal device applies the QCL information in the TCI state to reception on a PDSCH and a CSI-RS resource, and applies the information for determining a spatial filter and/or a path loss reference signal in the TCI state to transmission on a PUSCH and a SRS resource.

For example, a UE can be provided with a higher layer parameter commonTciStateData that is used to indicate the UE to operate in a single common TCI state operation mode for PDSCH, PUSCH, CSI-RS resource and SRS resource. When the UE receives a first TCI state for common TCI state operation through a DCI or a MAC CE, the UE may apply the QCL information indicated in the first TCI state on the reception of UE-specific PDSCH and CSI-RS resource and the UE may apply the information of spatial filter and path loss RS provided in the first TCI state to determine a spatial filter and to estimate path loss for transmitting PUSCH and SRS resources.

As can be seen, methods for single TCI state based multi-beam operation are provided in some exemplary implementations. The UE can be provided with one or more TCI state and each TCI state can include one or more reference signal providing QCL information for reception of downlink channels or signals and one reference signal providing information for determining a spatial filter for transmission of uplink channels and signals. Each TCI state can also be associated with a path loss reference signal. The UE can be configured with a 'common TCI' operation mode and a TCI state is signaled to the UE to provide QCL assumption for the reception of downlink channels and signals in one CC and spatial setting for the transmission of uplink channels and signals. A higher layer parameter can be configured to a CSI-RS resource set or a CSI-RS resource to indicate that the CSI-RS resources in that set or the CSI-RS resource follow the TCI state indicated for the common TCI state operation. A CSI-RS resource set configured with the parameter repetition can follow the TCI state indicated for the 'common TCI' operation. The benefit for that is the UE can refine the beam with respect to the 'current Tx beam'. A higher layer parameter can be configured to an SRS resource set or an SRS resource to indicate that the SRS resources in the SRS resource set or the SRS resource may follow the spatial setting and/or path loss RS provided by the TCI state of the common TCI operation.

FIG. 4 is a schematic diagram of a method for TCI state configuration according to an implementation of the present disclosure. As shown in FIG. 4, the method includes act 410. In act 410, a network device configures one or more TCI states for a terminal device. Herein, each of the one or more TCI states includes one or more of: QCL information for downlink reception, information for determining a spatial filter for uplink transmission, or information for determining a path loss reference signal for uplink transmission.

In an exemplary implementation, each of the one or more TCI states includes one or more of following parameters: a reference signal configured for QCL-TypeD quasi co-location type; a reference signal for determining a spatial filter for uplink transmission; a reference signal configured for QCL-TypeD quasi co-location type and for determining a spatial filter for uplink transmission; a reference signal for determining a path loss reference signal for uplink transmission; or a reference signal configured for QCL-TypeD quasi co-location type and for determining a spatial filter and a path loss reference signal for uplink transmission.

In an exemplary implementation, the reference signal configured for QCL-TypeD quasi co-location type is a SS/PBCH block, a CSI-RS resource, or a SRS resource; the reference signal for determining a spatial filter for uplink transmission is an SS/PBCH block, a CSI-RS resource or an SRS resource; the reference signal for determining a path loss reference signal for uplink transmission is an SS/PBCH block or a CSI-RS resource.

In an exemplary implementation, for a first reference signal configured in a TCI state, the TCI state includes one or more of following parameters: a parameter for indicating the quasi co-location type of the first reference signal; a parameter for indicating whether the first reference signal provides information for determining a spatial filter for uplink transmission; or a parameter for indicating whether the first reference signal provides information of a path loss reference signal for uplink transmission. Herein, the quasi co-location type of the first reference signal may be QCL-TypeA, QCL-TypeB, QCL-TypeC or QCL-TypeD.

In an exemplary implementation, a reference signal configured for QCL-TypeD quasi co-location type in a TCI state is used for the terminal device to estimate path loss for determining a transmit power for uplink transmission, or a reference signal configured for QCL-TypeA, QCL-TypeB or QCL-TypeC quasi co-location type in the TCI state is used for the terminal device to estimate path loss for determining a transmit power for uplink transmission.

In an exemplary implementation, the network device sends a DCI indicating a first TCI state to the terminal device. When the first TCI state does not include configuration of a spatial filter for uplink transmission, a reference signal configured for QCL-TypeD quasi co-location type in the first TCI state is used for the terminal device to derive a spatial filter for uplink transmission. When the first TCI state does not include configuration of a path loss reference signal for uplink transmission, the reference signal configured for QCL-TypeD quasi co-location type in the first TCI state is used for the terminal device to estimate path loss for uplink transmission, or a reference signal configured in the QCL information in the first TCI state is used for the terminal device to estimate path loss for uplink transmission.

In an exemplary implementation, the downlink reception includes reception on at least one of: a PDSCH, a PDCCH or a CSI-RS resource, and the uplink transmission includes transmission on at least one of: a PUSCH, a PUCCH or a SRS resource.

In an exemplary implementation, the network device configures the one or more TCI states for the terminal device through RRC signaling.

Figure 5:
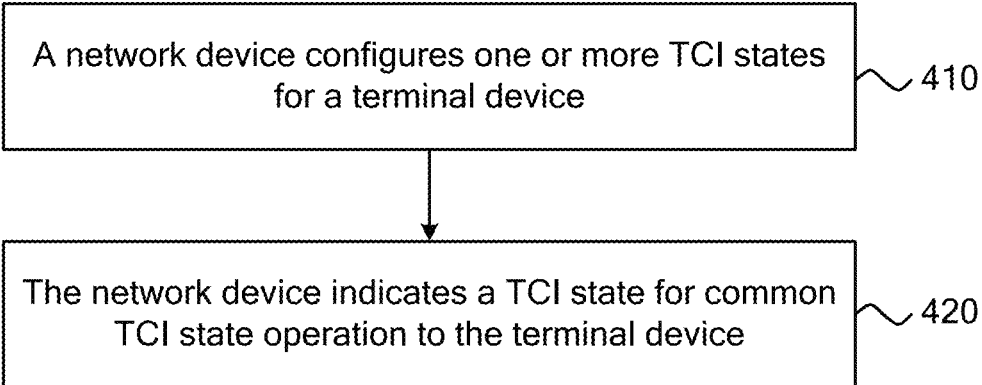
FIG. 5 is a schematic diagram of a method for TCI state configuration according to an implementation of the present disclosure.

FIG. 5 is a schematic diagram of a method for TCI state configuration according to an implementation of the present disclosure. As shown in FIG. 5, in addition to the act 410, the method may further include act 420. In act 420, the network device indicates a TCI state for common TCI state operation to the terminal device.

In an exemplary implementation, the network device indicates a TCI state for common TCI state operation to the terminal device through a DCI or a MAC CE. The QCL information in the TCI state is to be applied to reception on a PDCCH and a PDSCH, and the information for determining a spatial filter and/or a path loss reference signal in the TCI state is to be applied to transmission on a PUSCH and a PUCCH.

In an exemplary implementation, a CSI-RS resource set is configured with a parameter for indicating whether the terminal device is requested to perform reception on CSI-RS resources in the CSI-RS resource set by following the QCL information in the TCI state for common TCI state operation; or a CSI-RS resource is configured with a parameter for indicating whether the terminal device is requested to perform reception on the CSI-RS resource by following the QCL information in the TCI state for common TCI state operation.

In an exemplary implementation, a SRS resource set is configured with a parameter for indicating whether the terminal device is requested to perform transmission on SRS resources in the SRS resource set by following the information for determining a spatial filter and/or a path loss reference signal in the TCI state for common TCI state operation; or a SRS resource is configured with a parameter for indicating whether the terminal device is requested to perform transmission on the SRS resource by following the information for determining a spatial filter and/or a path loss reference signal in the TCI state for common TCI state operation.

In an exemplary implementation, the QCL information in the TCI state for common TCI state operation is also to be applied to reception on CSI-RS resources in a CSI-RS resource set.

In an exemplary implementation, the information for determining a spatial filter and/or a path loss reference signal in the TCI state for common TCI state operation is also to be applied to transmission on SRS resources in an SRS resource set.

In an exemplary implementation, the network device indicates a TCI state for common TCI state operation in downlink to the terminal device through a DCI or a MAC CE. The QCL information in the TCI state is to be applied to reception on a PDCCH, a PDSCH and a CSI-RS resource.

In an exemplary implementation, the network device indicates a TCI state for common TCI state operation in uplink to the terminal device through a DCI or a MAC CE. The information for determining a spatial filter and/or a path loss reference signal in the TCI state is to be applied to transmission on a PUSCH, a PUCCH and a SRS resource.

In an exemplary implementation, the network device indicates a TCI state for common TCI state operation for control channels to the terminal device through a DCI or a MAC CE. The QCL information in the TCI state is to be applied to reception on a PDCCH, and the information for determining a spatial filter and/or a path loss reference signal in the TCI state is to be applied to transmission on a PUCCH.

In an exemplary implementation, the network device indicates a TCI state for common TCI state operation for data channels and reference signals to the terminal device through a DCI or a MAC CE. The QCL information in the TCI state is to be applied to reception on a PDSCH and a CSI-RS resource, and the information for determining a spatial filter and/or a path loss reference signal in the TCI state is to be applied to transmission on a PUSCH and a SRS resource.

Herein, it should be understood that the methods of FIG. 4 and FIG. 5 correspond to the methods of FIG. 2 and FIG. 3, and relevant implementation details and examples of the methods of FIG. 4 and FIG. 5 are similar as those described above for the methods of FIG. 2 and FIG. 3, and will not be repeated here for conciseness of the present disclosure.

Figure 6:
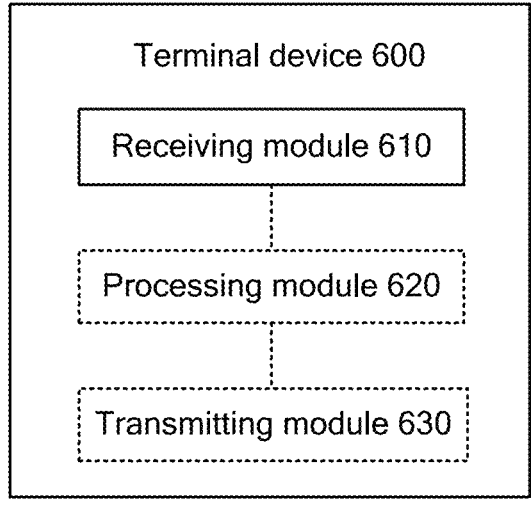
FIG. 6 is a schematic diagram of a terminal device according to an implementation of the present disclosure.

FIG. 6 shows a schematic diagram of a terminal device 600 according to an implementation of the present disclosure. As shown in FIG. 6, the terminal device 600 includes a receiving module 610. The receiving module 610 is configured to receive configuration of one or more TCI states from a network device. Herein, each of the one or more TCI states includes one or more of: QCL information for downlink reception, information for determining a spatial filter for uplink transmission, or information for determining a path loss reference signal for uplink transmission.

In an exemplary implementation, each of the one or more TCI states includes one or more of following parameters: a reference signal configured for QCL-TypeD quasi co-location type; a reference signal for determining a spatial filter for uplink transmission; a reference signal configured for QCL-TypeD quasi co-location type and for determining a spatial filter for uplink transmission; a reference signal for determining a path loss reference signal for uplink transmission; or a reference signal configured for QCL-TypeD quasi co-location type and for determining a spatial filter and a path loss reference signal for uplink transmission.

In an exemplary implementation, the reference signal configured for QCL-TypeD quasi co-location type is a SS/PBCH block, a CSI-RS resource, or an SRS resource. The reference signal for determining a spatial filter for uplink transmission is an SS/PBCH block, a CSI-RS resource or an SRS resource. The reference signal for determining a path loss reference signal for uplink transmission is an SS/PBCH block or a CSI-RS resource.

In an exemplary implementation, for a first reference signal configured in a TCI state, the TCI state includes one or more of following parameters: a parameter for indicating the quasi co-location type of the first reference signal; a parameter for indicating whether the first reference signal provides information for determining a spatial filter for uplink transmission; or a parameter for indicating whether the first reference signal provides information of a path loss reference signal for uplink transmission. The quasi co-location type of the first reference signal may be QCL-TypeA, QCL-TypeB, QCL-TypeC or QCL-TypeD.

In an exemplary implementation, the terminal device 600 further includes a processing module 620 configured to estimate path loss for determining a transmit power for uplink transmission by using a reference signal configured for QCL-TypeD quasi co-location type in a TCI state, or estimate path loss for determining a transmit power for uplink transmission by using a reference signal configured for QCL-TypeA, QCL-TypeB or QCL-TypeC quasi co-location type in the TCI state.

In an exemplary implementation, the receiving module 610 is further configured to receive, from the network device, a DCI indicating a first TCI state, and the terminal device 600 further includes a processing module 620 configured to, when the first TCI state does not include configuration of a spatial filter for uplink transmission, derive a spatial filter for uplink transmission by using a reference signal configured for QCL-TypeD quasi co-location type in the first TCI state. The processing module 620 may be further configured to, when the first TCI state does not include configuration of a path loss reference signal for uplink transmission, estimate path loss for uplink transmission by using the reference signal configured for QCL-TypeD quasi co-location type in the first TCI state, or estimate path loss for uplink transmission by using a reference signal configured in the QCL information in the first TCI state.

In an exemplary implementation, the downlink reception includes reception on at least one of: a PDSCH, a PDCCH or a CSI-RS resource, and the uplink transmission includes transmission on at least one of: a PUSCH, a PUCCH or a SRS resource.

In an exemplary implementation, the receiving module 610 is configured to receive the configuration of the one or more TCI states through RRC signaling.

In an exemplary implementation, the receiving module 610 is further configured to receive, from the network device, indication of a TCI state for common TCI state operation, through a DCI or a MAC CE, and the terminal device 600 further includes a processing module 620 configured to apply the QCL information in the TCI state to reception on a PDCCH and a PDSCH, and apply the information for determining a spatial filter and/or a path loss reference signal in the TCI state to transmission on a PUSCH and a PUCCH.

In an exemplary implementation, the receiving module 610 is further configured to perform reception on CSI-RS resources in a CSI-RS resource set by following the QCL information in the TCI state for common TCI state operation, when the CSI-RS resource set is configured with a parameter indicating that the terminal device is requested to perform reception on CSI-RS resources in the CSI-RS resource set by following the QCL information in the TCI state for common TCI state operation; or the receiving module 610 is further configured to perform reception on a CSI-RS resource by following the QCL information in the TCI state for common TCI state operation, when the CSI-RS resource is configured with a parameter indicating that the terminal device is requested to perform reception on the CSI-RS resource by following the QCL information in the TCI state for common TCI state operation.

In an exemplary implementation, the terminal device 600 further includes a transmitting module 630 configured to perform transmission on SRS resources in a SRS resource set by following the information for determining a spatial filter and/or a path loss reference signal in the TCI state for common TCI state operation, when the SRS resource set is configured with a parameter indicating that the terminal device is requested to perform transmission on SRS resources in the SRS resource set by following the information for determining a spatial filter and/or a path loss reference signal in the TCI state for common TCI state operation; or the transmitting module 630 is configured to perform transmission on a SRS resource by following the information for determining a spatial filter and/or a path loss reference signal in the TCI state for common TCI state operation, when the SRS resource is configured with a parameter indicating that the terminal device is requested to perform transmission on the SRS resource by following the information for determining a spatial filter and/or a path loss reference signal in the TCI state for common TCI state operation.

In an exemplary implementation, the processing module 620 is further configured to apply the QCL information in the TCI state for common TCI state operation to reception on CSI-RS resources in a CSI-RS resource set.

In an exemplary implementation, the processing module 620 is further configured to apply the information for determining a spatial filter and/or a path loss reference signal in the TCI state for common TCI state operation to transmission on SRS resources in an SRS resource set.

In an exemplary implementation, the receiving module 610 is further configured to receive, from the network device, indication of a TCI state for common TCI state operation in downlink, through a DCI or a MAC CE, and the terminal device 600 further includes a processing module 620 configured to apply the QCL information in the TCI state to reception on a PDCCH, a PDSCH and a CSI-RS resource.

In an exemplary implementation, the receiving module 610 is further configured to receive, from the network device, indication of a TCI state for common TCI state operation in uplink, through a DCI or a MAC CE, and the terminal device 600 further includes a processing module 620 configured to apply the information for determining a spatial filter and/or a path loss reference signal in the TCI state to transmission on a PUSCH, a PUCCH and a SRS resource.

In an exemplary implementation, the receiving module 610 is further configured to receive, from the network device, indication of a TCI state for common TCI state operation for control channels, through a DCI or a MAC CE, and the terminal device 600 further includes a processing module 620 configured to apply the QCL information in the TCI state to reception on a PDCCH, and apply the information for determining a spatial filter and/or a path loss reference signal in the TCI state to transmission on a PUCCH.

In an exemplary implementation, the receiving module 610 is further configured to receive, from the network device, indication of a TCI state for common TCI state operation for data channels and reference signals, through a DCI or a MAC CE, and the terminal device 600 further includes a processing module 620 configured to apply the QCL information in the TCI state to reception on a PDSCH and a CSI-RS resource, and apply the information for determining a spatial filter and/or a path loss reference signal in the TCI state to transmission on a PUSCH and a SRS resource.

It should be understood that the terminal device 600 in the above exemplary implementations can be the terminal device in the various implementations and examples relating to the methods of FIG. 2 and FIG. 3, and the operations and/or functions of the terminal device 600 are respectively for the purpose of implementing corresponding acts of the terminal device in the various method implementations relating to FIG. 2 and FIG. 3, and accordingly, relevant details and examples can be similar as those described above for the method implementations relating to FIG. 2 and FIG. 3 and will not be repeated here for conciseness of the present disclosure.

Figure 7:
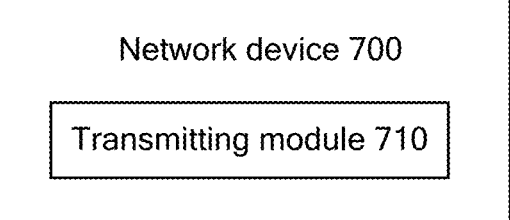
FIG. 7 is a schematic diagram of a network device according to an implementation of the present disclosure.

FIG. 7 shows a schematic diagram of a network device 700 according to an implementation of the present disclosure. As shown in FIG. 7, the network device 700 includes a transmitting module 710. The transmitting module 710 is configured to send configuration of one or more TCI states to a terminal device. Herein, each of the one or more TCI states includes one or more of: QCL information for downlink reception, information for determining a spatial filter for uplink transmission, or information for determining a path loss reference signal for uplink transmission.

In an exemplary implementation, each of the one or more TCI states includes one or more of following parameters: a reference signal configured for QCL-TypeD quasi co-location type; a reference signal for determining a spatial filter for uplink transmission; a reference signal configured for QCL-TypeD quasi co-location type and for determining a spatial filter for uplink transmission; a reference signal for determining a path loss reference signal for uplink transmission; or a reference signal configured for QCL-TypeD quasi co-location type and for determining a spatial filter and a path loss reference signal for uplink transmission.

In an exemplary implementation, the reference signal configured for QCL-TypeD quasi co-location type is a SS/PBCH block, a CSI-RS resource, or a SRS resource; the reference signal for determining a spatial filter for uplink transmission is an SS/PBCH block, a CSI-RS resource or an SRS resource; the reference signal for determining a path loss reference signal for uplink transmission is an SS/PBCH block or a CSI-RS resource.

In an exemplary implementation, for a first reference signal configured in a TCI state, the TCI state includes one or more of following parameters: a parameter for indicating the quasi co-location type of the first reference signal; a parameter for indicating whether the first reference signal provides information for determining a spatial filter for uplink transmission; or a parameter for indicating whether the first reference signal provides information of a path loss reference signal for uplink transmission. Herein, the quasi co-location type of the first reference signal may be QCL-TypeA, QCL-TypeB, QCL-TypeC or QCL-TypeD.

In an exemplary implementation, a reference signal configured for QCL-TypeD quasi co-location type in a TCI state is used for the terminal device to estimate path loss for determining a transmit power for uplink transmission, or a reference signal configured for QCL-TypeA, QCL-TypeB or QCL-TypeC quasi co-location type in the TCI state is used for the terminal device to estimate path loss for determining a transmit power for uplink transmission.

In an exemplary implementation, the transmitting module 710 is further configured to send a DCI indicating a first TCI state to the terminal device. When the first TCI state does not include configuration of a spatial filter for uplink transmission, a reference signal configured for QCL-TypeD quasi co-location type in the first TCI state is used for the terminal device to derive a spatial filter for uplink transmission. When the first TCI state does not include configuration of a path loss reference signal for uplink transmission, the reference signal configured for QCL-TypeD quasi co-location type in the first TCI state is used for the terminal device to estimate path loss for uplink transmission, or a reference signal configured in the QCL information in the first TCI state is used for the terminal device to estimate path loss for uplink transmission.

In an exemplary implementation, the downlink reception includes reception on at least one of: a PDSCH, a PDCCH or a CSI-RS resource, and the uplink transmission includes transmission on at least one of: a PUSCH, a PUCCH or a SRS resource.

In an exemplary implementation, the transmitting module 710 is configured to send the configuration of the one or more TCI states to the terminal device through RRC signaling.

In an exemplary implementation, the transmitting module 710 is further configured to send indication of a TCI state for common TCI state operation to the terminal device through a DCI or a MAC CE. The QCL information in the TCI state is to be applied to reception on a PDCCH and a PDSCH, and the information for determining a spatial filter and/or a path loss reference signal in the TCI state is to be applied to transmission on a PUSCH and a PUCCH.

In an exemplary implementation, the QCL information in the TCI state for common TCI state operation is also to be applied to reception on CSI-RS resources in a CSI-RS resource set, when the CSI-RS resource set is configured with a parameter indicating that the terminal device is requested to perform reception on CSI-RS resources in the CSI-RS resource set by following the QCL information in the TCI state for common TCI state operation; or the QCL information in the TCI state for common TCI state operation is also to be applied to reception on a CSI-RS resource, when the CSI-RS resource is configured with a parameter indicating that the terminal device is requested to perform reception on the CSI-RS resource by following the QCL information in the TCI state for common TCI state operation.

In an exemplary implementation, the information for determining a spatial filter and/or a path loss reference signal in the TCI state for common TCI state operation is also to be applied to transmission on SRS resources in an SRS resource set, when the SRS resource set is configured with a parameter indicating that the terminal device is requested to perform transmission on SRS resources in the SRS resource set by following the information for determining a spatial filter and/or a path loss reference signal in the TCI state for common TCI state operation; or the information for determining a spatial filter and/or a path loss reference signal in the TCI state for common TCI state operation is also to be applied to transmission on a SRS resource, when the SRS resource is configured with a parameter indicating that the terminal device is requested to perform transmission on the SRS resource by following the information for determining a spatial filter and/or a path loss reference signal in the TCI state for common TCI state operation.

In an exemplary implementation, the QCL information in the TCI state for common TCI state operation is also to be applied to reception on CSI-RS resources in a CSI-RS resource set.

In an exemplary implementation, the information for determining a spatial filter and/or a path loss reference signal in the TCI state for common TCI state operation is also to be applied to transmission on SRS resources in an SRS resource set.

In an exemplary implementation, the transmitting module 710 is further configured to send indication of a TCI state for common TCI state operation in downlink to the terminal device through a DCI or a MAC CE. The QCL information in the TCI state is to be applied to reception on a PDCCH, a PDSCH and a CSI-RS resource.

In an exemplary implementation, the transmitting module 710 is further configured to send indication of a TCI state for common TCI state operation in uplink to the terminal device through a DCI or a MAC CE. The information for determining a spatial filter and/or a path loss reference signal in the TCI state is to be applied to transmission on a PUSCH, a PUCCH and a SRS resource.

In an exemplary implementation, the transmitting module 710 is further configured to send indication of a TCI state for common TCI state operation for control channels to the terminal device through a DCI or a MAC CE. The QCL information in the TCI state is to be applied to reception on a PDCCH, and the information for determining a spatial filter and/or a path loss reference signal in the TCI state is to be applied to transmission on a PUCCH.

In an exemplary implementation, the transmitting module 710 is further configured to send indication of a TCI state for common TCI state operation for data channels and reference signals to the terminal device through a DCI or a MAC CE. The QCL information in the TCI state is to be applied to reception on a PDSCH and a CSI-RS resource, and the information for determining a spatial filter and/or a path loss reference signal in the TCI state is to be applied to transmission on a PUSCH and a SRS resource.

It should be understood that the network device 700 in the above exemplary implementations can be the network device in the various implementations and examples relating to the methods of FIGS. 2-5, and the operations and/or functions of the network device 700 are respectively for the purpose of implementing corresponding acts of the network device in the various method implementations relating to FIGS. 2-5, and accordingly, relevant details and examples can be similar as those described above for the method implementations relating to FIGS. 2-5 and will not be repeated here for conciseness of the present disclosure.

Figure 8:
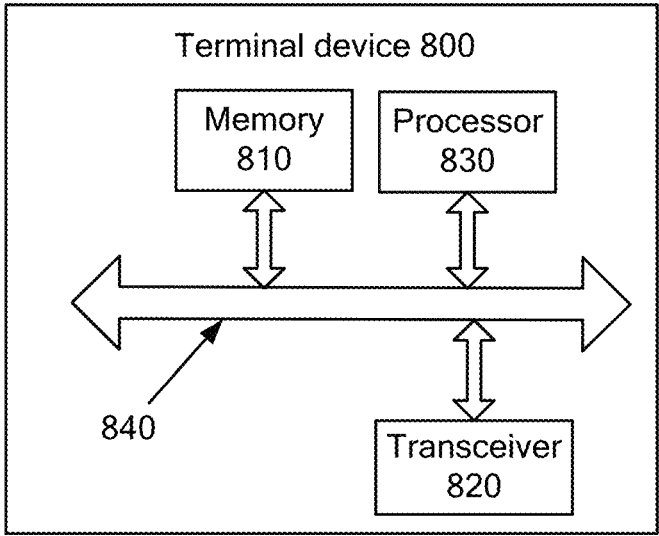
FIG. 8 is a schematic diagram of structure of a terminal device according to an exemplary implementation of the present disclosure.

FIG. 8 shows a schematic diagram of structure of a terminal device 800 according to an exemplary implementation of the present disclosure. As shown in FIG. 8, the terminal device 800 may include a memory 810, a transceiver 820, and a processor 830. The memory 810 may be configured to store data and/or information. The memory 810 may be further configured to store instructions executable by the processor 830, and the processor 830 may be configured to execute the instructions stored in the memory 810 to control the transceiver 820 to receive and/or send signals. Particularly, the transceiver 820 may be configured to implement the functions/operations of the aforementioned receiving module 610 and transmitting module 630. The processor 830 may be configured to implement the functions/operations of the aforementioned processing module 620. Functions/operations of the receiving module 610, processing module 620, and transmitting module 630 are already described in the above and will not be repeated here for conciseness of the present disclosure. The terminal device 800 may further include a bus system 840, which may be configured to connect the components, such as the memory 810, the transceiver 820, and the processor 830, of the terminal device 800.

Herein, it should be understood that the memory 810 may include a read only memory and a random access memory, and may provide instructions and data to the processor 830. A portion of the memory 810 may further include a non-volatile random access memory. For example, the memory 810 may further store device type information and/or other information.

The processor 830 may be a central processing unit (CPU) or other general-purpose processor, a digital signal processor (DSP), an application specific integrated circuit (ASIC), an off-the-shelf programmable gate array (FPGA) or other programmable logic device, a discrete gate or a transistor logic device, or a discrete hardware component, etc. The general-purpose processor may be a microprocessor or any conventional processor.

The bus system 840 may include, in addition to a data bus, a power bus, a control bus, a status signal bus, etc. However, for the sake of clarity, various buses are illustrated as the bus system 840 in FIG. 8.

The various acts of the terminal device in the exemplary implementations relating to the methods of FIG. 2 and FIG. 3 may be implemented by instructions of software or integrated logic circuits of hardware or combination of software and hardware. The software modules may be located in a typical storage medium in the art such as a random access memory, a flash memory, a read-only memory, a programmable read-only memory, an electrically erasable programmable memory, a register, etc. The storage medium may be located in the memory 810, and the processor 830 may read the information in the memory 810 and control the transceiver 820 to send and/or receive signals.

It should be understood that the terminal device 800 can be the terminal device in the various implementations and examples relating to the methods of FIG. 2 and FIG. 3. The terminal device 800 may implement corresponding acts of the terminal device in the various method implementations relating to FIG. 2 and FIG. 3, and accordingly, relevant details and examples can be similar as those described above for the method implementations relating to FIG. 2 and FIG. 3 and will not be repeated here for conciseness of the present disclosure.

Figure 9:
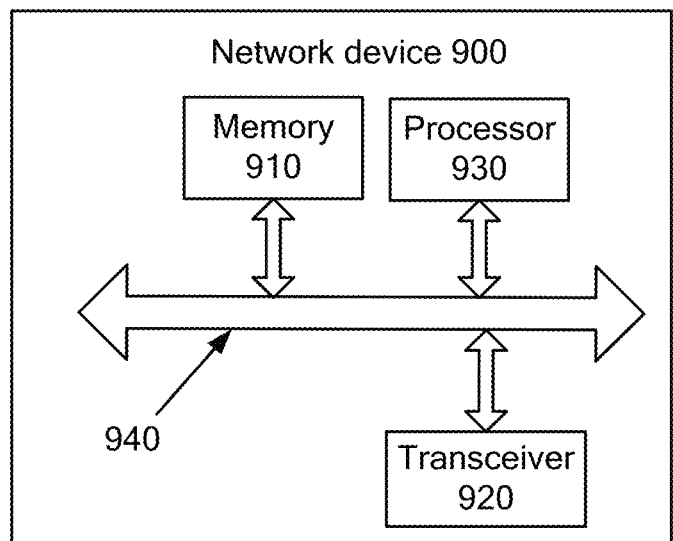
FIG. 9 is a schematic diagram of structure of a network device according to an exemplary implementation of the present disclosure.

FIG. 9 shows a schematic diagram of structure of a network device 900 according to an exemplary implementation of the present disclosure. As shown in FIG. 9, the network device 900 may include a memory 910, a transceiver 920, and a processor 930. The memory 910 may be configured to store instructions executable by the processor 930, and the processor 930 may be configured to execute the instructions stored in the memory 910 to control the transceiver 920 to receive and/or send signals. Particularly, the transceiver 920 may be configured to implement the functions/operations of the aforementioned transmitting module 710. Functions/operations of the transmitting module 710 are already described in the above and will not be repeated here for conciseness of the present disclosure. The network device 900 may further include a bus system 940, which may be configured to connect the components, such as the memory 910, the transceiver 920, and the processor 930, of the network device 900.

Herein, it should be understood that the memory 910 may include a read only memory and a random access memory, and may provide instructions and data to the processor 930. A portion of the memory 910 may further include a non-volatile random access memory. For example, the memory 910 may further store device type information and/or other information.

The processor 930 may be a central processing unit (CPU) or other general-purpose processor, a digital signal processor (DSP), an application specific integrated circuit (ASIC), an off-the-shelf programmable gate array (FPGA) or other programmable logic device, a discrete gate or a transistor logic device, or a discrete hardware component, etc. The general-purpose processor may be a microprocessor or any conventional processor.

The bus system 940 may include, in addition to a data bus, a power bus, a control bus, a status signal bus, etc. However, for the sake of clarity, various buses are illustrated as the bus system 940 in FIG. 9.

The various acts of the network device in the exemplary implementations relating to the methods of FIGS. 2-5 may be implemented by instructions of software or integrated logic circuits of hardware or combination of software and hardware. The software modules may be located in a typical storage medium in the art such as a random access memory, a flash memory, a read-only memory, a programmable read-only memory, an electrically erasable programmable memory, a register, etc. The storage medium may be located in the memory 910, and the processor 930 may read the information in the memory 910 and control the transceiver 920 to send and/or receive signals.

It should be understood that the network device 900 can be the network device in the various implementations and examples relating to the methods of FIGS. 2-5. The network device 900 may implement corresponding acts of the network device in the various method implementations relating to FIGS. 2-5, and accordingly, relevant details and examples can be similar as those described above for the method implementations relating to FIGS. 2-5 and will not be repeated here for conciseness of the present disclosure.

Further, a computer readable storage medium is provided in the present disclosure. The computer readable storage medium may store instructions that are executable by a computer or processor to implement any of the aforementioned method for TCI state configuration and/or any exemplary implementation thereof.

It should be understood that in various implementations of the present disclosure, the term "and/or" is used to describe an association relationship between associated objects, indicating that there may be three relationships, for example, a and/or b may indicate three situations: A alone, A and B, and B alone. In addition, the symbol "/" in the present disclosure generally indicates that objects of the former and the latter connected by "/" has an "or" relationship.

Those skilled in the art should understand that the elements and acts in the various implementations disclosed herein may be implemented in electronic hardware, computer software, or a combination of the electronic hardware and the computer software. In order to clearly illustrate the interchangeability of hardware and software, the composition and acts in the implementations have been described in general terms by functions in the above description. Whether these functions are performed in hardware or software depends on the specific application and design constraints of the technical solution. Skilled artisans may use different methods to implement the described functions for each particular application, but such implementation should not be considered to be beyond the scope of the present disclosure.

Those skilled in the art should understand that the specific working processes of the devices and modules described above may correspond to the corresponding processes in the method implementations and may not be repeated for convenience and conciseness of description.

In various implementations of the present disclosure, it should be understood that the disclosed methods and devices may be implemented in other ways. For example, the device implementations described above are merely illustrative, the division of modules is only a logical function division, and there may be other ways of division in actual implementations. For example, multiple modules or components may be combined or integrated into another system, or some features may be ignored or not executed. In addition, the coupling or communication connection between the elements shown or discussed may be a direct coupling or indirect coupling, or communication connection through some interface, device or unit, or may be an electrical, mechanical or other form of connection.

The components described as separate components may be or may not be physically separated, and the component may be or may not be a physical component, i.e., it may be located in one place or may be distributed over multiple network units. Some or all of the components may be selected according to actual needs to achieve the purpose of the implementations of the present disclosure.

The modules may be stored in a computer readable storage medium if they are implemented in the form of software function modules and sold or used as an independent product. Based on such understanding, the technical solutions of the present disclosure may be embodied in the form of a software product, which is stored in a storage medium and includes instructions for causing a computer device (which may be a personal computer, a server, a terminal device, or a network device, etc.) to perform all or part of the acts of the method in various implementations of the present disclosure. The storage media may include a U disk, a mobile hard disk, a read-only memory, a random access memory, a magnetic disk, an optical disk, or other media capable of storing program codes.

What are described above are merely exemplary implementations of the present disclosure. Although the exemplary implementations have been described in considerable detail above, numerous variations and modifications will become apparent to those skilled in the art once the above disclosure is fully appreciated. It is intended that the following claims be interpreted to embrace all such variations and modifications.

The invention claimed is:

1. A method for transmission configuration indicator (TCI) state configuration, comprising:

receiving, by a terminal device, configuration of one TCI state from a network device;

wherein the one TCI state comprises one or more of:

quasi co-location (QCL) information for downlink reception;

information for determining a spatial filter for uplink transmission; or information for determining a path loss reference signal for uplink transmission; wherein the one TCI state comprises a reference signal configured for QCL-TypeD quasi co-location type and for determining a spatial filter for uplink transmission; or, a reference signal for determining a path loss reference signal for uplink transmission;

or receiving, by a terminal device, configuration of a plurality of TCI states from a network device;

wherein each of the plurality of TCI states comprises one or more of:

quasi co-location (QCL) information for downlink reception;

information for determining a spatial filter for uplink transmission; or information for determining a path loss reference signal for uplink transmission; wherein each of the plurality of TCI states comprises a reference signal configured for QCL-TypeD quasi co-location type and for determining a spatial filter for uplink transmission; or, a reference signal for determining a path loss reference signal for uplink transmission; the method further comprises:

receiving, by the terminal device from the network device, indication of a TCI state for common TCI state operation in downlink, through downlink control information (DCI) or a media access control (MAC) control element (CE); and applying, by the terminal device, the QCL information in the TCI state to reception on a physical downlink control channel (PDCCH), a physical downlink shared channel (PDSCH) and a channel state information reference signal (CSI-RS) resource, or receiving, by the terminal device from the network device, indication of a TCI state for common TCI state operation in uplink, through downlink control information (DCI) or a media access control (MAC) control element (CE); and applying, by the terminal device, the information for determining a spatial filter and/or a path loss reference signal in the TCI state to transmission on a physical uplink shared channel (PUSCH), a physical uplink control channel (PUCCH) and a sounding reference signal (SRS) resource, or, receiving, by the terminal device from the network device, indication of a TCI state for common TCI state operation for control channels, through downlink control information (DCI) or a media access control (MAC) control element (CE); and applying, by the terminal device, the QCL information in the TCI state to reception on a physical downlink control channel (PDCCH), and applying, by the terminal device, the information for determining a spatial filter and/or a path loss reference signal in the TCI state to transmission on a physical uplink control channel (PUCCH), or, receiving, by the terminal device from the network device, indication of a TCI state for common TCI state operation for data channels and reference signals, through downlink control information (DCI) or a media access control (MAC) control element (CE); and applying, by the terminal device, the QCL information in the TCI state to reception on a physical downlink shared channel (PDSCH) and a channel state information reference signal (CSI-RS) resource, and applying, by the terminal device, the information for determining a spatial filter and/or a path loss reference signal in the TCI state to transmission on a physical uplink shared channel (PUSCH) and a sounding reference signal (SRS) resource.

2. The method of claim 1, wherein the reference signal configured for QCL-TypeD quasi co-location type is a synchronization signal/physical broadcast channel (SS/PBCH) block, a channel state information reference signal (CSI-RS) resource, or a sounding reference signal (SRS) resource;

the reference signal for determining a spatial filter for uplink transmission is an SS/PBCH block, a CSI-RS resource or an SRS resource.

3. The method of claim 1, further comprising:

receiving, by the terminal device from the network device, downlink control information (DCI) indicating a first TCI state; and in response to the first TCI state does not include configuration of a spatial filter for uplink transmission, deriving, by the terminal device, a spatial filter for uplink transmission by using a reference signal configured for QCL-TypeD quasi co-location type in the first TCI state.

4. The method of claim 1, wherein the downlink reception comprises reception on at least one of: a physical downlink shared channel (PDSCH), a physical downlink control channel (PDCCH) or a channel state information reference signal (CSI-RS) resource, and the uplink transmission comprises transmission on at least one of: a physical uplink shared channel (PUSCH), a physical uplink control channel (PUCCH) or a sounding reference signal (SRS) resource.

5. The method of claim 1, further comprising:

receiving, by the terminal device from the network device, indication of a TCI state for common TCI state operation, through downlink control information (DCI) or a media access control (MAC) control element (CE); and applying, by the terminal device, the QCL information in the TCI state to reception on a physical downlink control channel (PDCCH) and a physical downlink shared channel (PDSCH), and applying, by the terminal device, the information for determining a spatial filter and/or a path loss reference signal in the TCI state to transmission on a physical uplink shared channel (PUSCH) and a physical uplink control channel (PUCCH).

6. The method of claim 5, wherein a channel state information reference signal (CSI-RS) resource set is configured with a parameter for indicating whether the terminal device is requested to perform reception on CSI-RS resources in the CSI-RS resource set by following the QCL information in the TCI state for common TCI state operation; or a channel state information reference signal (CSI-RS) resource is configured with a parameter for indicating whether the terminal device is requested to perform reception on the CSI-RS resource by following the QCL information in the TCI state for common TCI state operation.

7. The method of claim 5, wherein a sounding reference signal (SRS) resource set is configured with a parameter for indicating whether the terminal device is requested to perform transmission on SRS resources in the SRS resource set by following the information for determining a spatial filter and/or a path loss reference signal in the TCI state for common TCI state operation; or a sounding reference signal (SRS) resource is configured with a parameter for indicating whether the terminal device is requested to perform transmission on the SRS resource by following the information for determining a spatial filter and/or a path loss reference signal in the TCI state for common TCI state operation.

8. The method of claim 5, further comprising:

applying, by the terminal device, the QCL information in the TCI state for common TCI state operation to reception on channel state information reference signal (CSI-RS) resources in a CSI-RS resource set, and applying, by the terminal device, the information for determining a spatial filter and/or a path loss reference signal in the TCI state for common TCI state operation to transmission on sounding reference signal (SRS) resources in an SRS resource set.

9. A terminal device, comprising: a processor and a transceiver, wherein the transceiver is configured to receive configuration of one transmission configuration indicator (TCI) state from a network device;

wherein the one TCI state comprises one or more of:

quasi co-location (QCL) information for downlink reception;

information for determining a spatial filter for uplink transmission; or information for determining a path loss reference signal for uplink transmission; wherein the one TCI state comprises a reference signal configured for QCL-TypeD quasi co-location type and for determining a spatial filter for uplink transmission; or, a reference signal for determining a path loss reference signal for uplink transmission;

or the transceiver is configured to receive configuration of more transmission configuration indicator (TCI) states from a network device;

wherein each of the more TCI states comprises one or more of:

quasi co-location (QCL) information for downlink reception;

information for determining a spatial filter for uplink transmission; or information for determining a path loss reference signal for uplink transmission; wherein each of the more TCI states comprises a reference signal configured for QCL-TypeD quasi co-location type and for determining a spatial filter for uplink transmission; or, a reference signal for determining a path loss reference signal for uplink transmission; wherein the transceiver is further configured to receive, from the network device, indication of a TCI state for common TCI state operation in downlink, through downlink control information (DCI) or a media access control (MAC) control element (CE); and the processor is configured to apply the QCL information in the TCI state to reception on a physical downlink control channel (PDCCH), a physical downlink shared channel (PDSCH) and a channel state information reference signal (CSI-RS) resource, or the transceiver is further configured to receive, from the network device, indication of a TCI state for common TCI state operation in uplink, through downlink control information (DCI) or a media access control (MAC) control element (CE); and the processor is configured to apply the information for determining a spatial filter and/or a path loss reference signal in the TCI state to transmission on a physical uplink shared channel (PUSCH), a physical uplink control channel (PUCCH) and a sounding reference signal (SRS) resource, or the transceiver is further configured to receive, from the network device, indication of a TCI state for common TCI state operation for control channels, through downlink control information (DCI) or a media access control (MAC) control element (CE); and the processor is configured to apply the QCL information in the TCI state to reception on a physical downlink control channel (PDCCH), and apply the information for determining a spatial filter and/or a path loss reference signal in the TCI state to transmission on a physical uplink control channel (PUCCH), or the transceiver is further configured to receive, from the network device, indication of a TCI state for common TCI state operation for data channels and reference signals, through downlink control information (DCI) or a media access control (MAC) control element (CE); and the processor is configured to apply the QCL information in the TCI state to reception on a physical downlink shared channel (PDSCH) and a channel state information reference signal (CSI-RS) resource, and apply the information for determining a spatial filter and/or a path loss reference signal in the TCI state to transmission on a physical uplink shared channel (PUSCH) and a sounding reference signal (SRS) resource.

10. The terminal device of claim 9, wherein the reference signal configured for QCL-TypeD quasi co-location type is a synchronization signal/physical broadcast channel (SS/PBCH) block, a channel state information reference signal (CSI-RS) resource, or a sounding reference signal (SRS) resource;

the reference signal for determining a spatial filter for uplink transmission is an SS/PBCH block, a CSI-RS resource or an SRS resource.

11. The terminal device of claim 9, wherein the transceiver is further configured to receive, from the network device, downlink control information (DCI) indicating a first TCI state; and the processor is configured to, in response to the first TCI state does not include configuration of a spatial filter for uplink transmission, derive a spatial filter for uplink transmission by using a reference signal configured for QCL-TypeD quasi co-location type in the first TCI state.

12. The terminal device of claim 9, wherein the downlink reception comprises reception on at least one of: a physical downlink shared channel (PDSCH), a physical downlink control channel (PDCCH) or a channel state information reference signal (CSI-RS) resource, and the uplink transmission comprises transmission on at least one of: a physical uplink shared channel (PUSCH), a physical uplink control channel (PUCCH) or a sounding reference signal (SRS) resource.

13. The terminal device of claim 9, wherein the transceiver is further configured to receive, from the network device, indication of a TCI state for common TCI state operation, through downlink control information (DCI) or a media access control (MAC) control element (CE); and the processor is configured to apply the QCL information in the TCI state to reception on a physical downlink control channel (PDCCH) and a physical downlink shared channel (PDSCH), and apply the information for determining a spatial filter and/or a path loss reference signal in the TCI state to transmission on a physical uplink shared channel (PUSCH) and a physical uplink control channel (PUCCH).

14. The terminal device of claim 13, wherein the transceiver is further configured to perform reception on channel state information reference signal (CSI-RS) resources in a CSI-RS resource set by following the QCL information in the TCI state for common TCI state operation, when the CSI-RS resource set is configured with a parameter indicating that the terminal device is requested to perform reception on CSI-RS resources in the CSI-RS resource set by following the QCL information in the TCI state for common TCI state operation; or the transceiver is further configured to perform reception on a channel state information reference signal (CSI-RS) resource by following the QCL information in the TCI state for common TCI state operation, when the CSI-RS resource is configured with a parameter indicating that the terminal device is requested to perform reception on the CSI-RS resource by following the QCL information in the TCI state for common TCI state operation, and, the transceiver is further configured to:

perform transmission on sounding reference signal (SRS) resources in a SRS resource set by following the information for determining a spatial filter and/or a path loss reference signal in the TCI state for common TCI state operation, when the SRS resource set is configured with a parameter indicating that the terminal device is requested to perform transmission on SRS resources in the SRS resource set by following the information for determining a spatial filter and/or a path loss reference signal in the TCI state for common TCI state operation; or perform transmission on a sounding reference signal (SRS) resource by following the information for determining a spatial filter and/or a path loss reference signal in the TCI state for common TCI state operation, when the SRS resource is configured with a parameter indicating that the terminal device is requested to perform transmission on the SRS resource by following the information for determining a spatial filter and/or a path loss reference signal in the TCI state for common TCI state operation.

15. The terminal device of claim 13, wherein the processor is further configured to apply the QCL information in the TCI state for common TCI state operation to reception on channel state information reference signal (CSI-RS) resources in a CSI-RS resource set, and apply the information for determining a spatial filter and/or a path loss reference signal in the TCI state for common TCI state operation to transmission on sounding reference signal (SRS) resources in an SRS resource set.

16. A network device, comprising: a processor and a transceiver, wherein the transceiver is configured to send configuration of one transmission configuration indicator (TCI) state to a terminal device;

wherein the one TCI state comprises one or more of:

quasi co-location (QCL) information for downlink reception;

information for determining a spatial filter for uplink transmission; or information for determining a path loss reference signal for uplink transmission; wherein the one TCI state comprises a reference signal configured for QCL-TypeD quasi co-location type and for determining a spatial filter for uplink transmission; or, a reference signal for determining a path loss reference signal for uplink transmission;

or the transceiver is configured to send configuration of more transmission configuration indicator (TCI) states to a terminal device;

wherein each of the more TCI states comprises one or more of:

quasi co-location (QCL) information for downlink reception;

information for determining a spatial filter for uplink transmission; or information for determining a path loss reference signal for uplink transmission; wherein each of the more TCI states comprises a reference signal configured for QCL-TypeD quasi co-location type and for determining a spatial filter for uplink transmission; or, a reference signal for determining a path loss reference signal for uplink transmission; wherein the transceiver is further configured to send indication of a TCI state for common TCI state operation in downlink to the terminal device, through downlink control information (DCI) or a media access control (MAC) control element (CE), wherein the QCL information in the TCI state is to be applied to reception on a physical downlink control channel (PDCCH), a physical downlink shared channel (PDSCH) and a channel state information reference signal (CSI-RS) resource; or wherein the transceiver is further configured to send indication of a TCI state for common TCI state operation in uplink to the terminal device, through downlink control information (DCI) or a media access control (MAC) control element (CE), wherein the information for determining a spatial filter and/or a path loss reference signal in the TCI state is to be applied to transmission on a physical uplink shared channel (PUSCH), a physical uplink control channel (PUCCH) and a sounding reference signal (SRS) resource; or wherein the transceiver is further configured to send indication of a TCI state for common TCI state operation for control channels to the terminal device, through downlink control information (DCI) or a media access control (MAC) control element (CE), wherein the QCL information in the TCI state is to be applied to reception on a physical downlink control channel (PDCCH), and the information for determining a spatial filter and/or a path loss reference signal in the TCI state is to be applied to transmission on a physical uplink control channel (PUCCH); or wherein the transceiver is further configured to send indication of a TCI state for common TCI state operation for data channels and reference signals to the terminal device, through downlink control information (DCI) or a media access control (MAC) control element (CE), wherein the QCL information in the TCI state is to be applied to reception on a physical downlink shared channel (PDSCH) and a channel state information reference signal (CSI-RS) resource, and the information for determining a spatial filter and/or a path loss reference signal in the TCI state is to be applied to transmission on a physical uplink shared channel (PUSCH) and a sounding reference signal (SRS) resource.

17. The network device of claim 16, wherein the reference signal configured for QCL-TypeD quasi co-location type is a synchronization signal/physical broadcast channel (SS/PBCH) block, a channel state information reference signal (CSI-RS) resource, or a sounding reference signal (SRS) resource;

the reference signal for determining a spatial filter for uplink transmission is an SS/PBCH block, a CSI-RS resource or an SRS resource.

18. The network device of claim 16, wherein the transceiver is further configured to send downlink control information (DCI) indicating a first TCI state to the terminal device;

wherein in response to the first TCI state does not include configuration of a spatial filter for uplink transmission, a reference signal configured for QCL-TypeD quasi co-location type in the first TCI state is used for the terminal device to derive a spatial filter for uplink transmission.

19. The network device of claim 16, wherein the downlink reception comprises reception on at least one of: a physical downlink shared channel (PDSCH), a physical downlink control channel (PDCCH) or a channel state information reference signal (CSI-RS) resource, and the uplink transmission comprises transmission on at least one of: a physical uplink shared channel (PUSCH), a physical uplink control channel (PUCCH) or a sounding reference signal (SRS) resource.

* * * * *